United States Patent [19]

Demarcq

[11] 3,899,550

[45] Aug. 12, 1975

[54] METHOD FOR ALKOXYLATION OF CHLORIDES AND BROMIDES OF TRIVALENT PHOSPHORUS

[75] Inventor: Michel Demarcq, Lyon, France

[73] Assignee: Produits Chimiques Ugine Kuhlmann, Paris, France

[22] Filed: Jan. 16, 1974

[21] Appl. No.: 433,709

[30] Foreign Application Priority Data
Feb. 21, 1973 France .............................. 73.06041

[52] U.S. Cl. .................................. 260/977; 260/977
[51] Int. Cl.² C07F 9/141; C07F 9/142; C07F 9/145; C07F 9/15
[58] Field of Search ...................................... 260/977

[56] References Cited
UNITED STATES PATENTS

| | | | |
|---|---|---|---|
| 2,157,164 | 5/1939 | Daly et al. | 260/977 |
| 2,866,809 | 12/1958 | Kolka | 260/977 |
| 3,324,205 | 6/1967 | Carpenter et al. | 260/977 X |
| 3,557,260 | 1/1971 | Gurgiolo | 260/977 |
| 3,787,537 | 1/1974 | De Marcq | 260/977 |
| 3,804,927 | 4/1974 | Lawson et al. | 260/977 |
| 3,810,961 | 5/1974 | Pivaiver | 260/977 |

FOREIGN PATENTS OR APPLICATIONS

| 1,032,240 | 6/1958 | Germany | 260/977 |
|---|---|---|---|

*Primary Examiner*—Richard L. Raymond
*Attorney, Agent, or Firm*—Pennie & Edmonds

[57] ABSTRACT

This invention relates to an improvement in the process of condensing chlorides and bromides of trivalent phosphorus with alkylene oxides to give corresponding β-haloalkyl esters of phosphorous acid, useful in the manufacture of fireproofing agents, growth regulators etc. The improvement comprises performing the condensation in the presence of a catalytic quantity of a suitable organic aluminum compound, whereby the reaction proceeds efficiently and substantially without competing side-reactions. In a preferred embodiment of this invention, the organic aluminum compound is used in conjunction with a suitable stabilizing base selected from organic amines and phosphines.

9 Claims, No Drawings

METHOD FOR ALKOXYLATION OF CHLORIDES AND BROMIDES OF TRIVALENT PHOSPHORUS

BACKGROUND OF THE INVENTION

It is known that the chlorides and bromides of trivalent phosphorus react with alkylene oxides to give corresponding β-haloalkyl esters of phosphorus acid which have a host of uses, particularly as intermediates in the manufacture of fireproofing agents, growth regulators and other useful products. The general reaction is represented by equation (1) wherein X is Cl or Br.

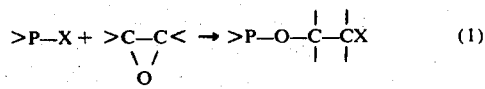

(1)

Numerous examples of this type of condensation are cited in Houben-Weyl "Methoden der Organischen Chemie" Vol. XII/1, p.209–210, 324 and 327 and Vol. XII/2, p. 17–18, 50 and 69–70.

The best known example is the reaction of phosphorus trichloride with ethylene oxide, according to equation (2)

(2)

and the instant invention will be described chiefly with reference to this particular reaction, without however in any way limiting thereby the applicability of the invention to the general class of reactions according to equation (1).

In practice, reaction (2) is carried out by simply introducing liquid or gaseous ethylene oxide into the agitated phosphorus trichloride in the absence of atmospheric moisture and usually at a temperature maintained within the range of about 10°–70°C, by cooling.

Phosphorus trichloride is readily available and the trichloroethyl phosphite made by reaction (2) has a ready market for numerous synthetic purposes. In particular trichloroethyl phosphite can easily be transesterified by other alcohols or polyols, condensed by the Birum reaction with acetaldehyde and dialkylphosphorochloridites, condensed with haloalkanes to give various alkanephosphonates (Michaelis-Arbuzov reaction), or isomerised by heating to form bis-(β-chloroethyl) β-chloroethane phosphonate, which itself is an intermediate in the preparation of vinylphosphonic acid and its esters and in that of β-chloroethane phosphonic acid, a plant growth-regulator known on the market under the name of ETHREL.

Now, the commercial processes commonly used to carry out reaction (2) are marked by several serious deficiencies.

When no catalyst is used, particularly when the reagents are of high purity, operation on an industrial scale is frequently encumbered by quite long periods of induction and momentary accumulation of large excesses of ethylene oxide in the reactor which can lead to sudden reactions approaching explosive violence. To explain these facts, it has been advanced that the presence of small trace of hydrochloric acid is necessary in order that reaction (2) can take place by the catalytic action of HCl according to equations (3) and (4):

(3)

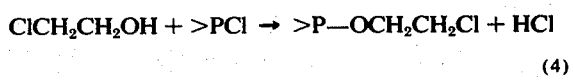

(4)

In consequence, it has been proposed to add a small quantity of hydrochloric acid or a compound which generates hydrochloric acid such as phosphorus acid or chloroethanol (U.S. Pat. No. 2,877,260; French Pat. No. 1,450,320) or a metallic chloride such as magnesium chloride (Japanese Pat. No. 67/19576.) However, hydrochloric acid is objectionable because it also leads to side reactions, as discussed further below, and thereby lowers the yield of pure trichlorethyl phosphite.

The prior art methods further result in trichloroethyl phosphite of low purity. The proportion of undesirable secondary products obtained can reach as high as 15 or even 20%, consisting principally of mono- or oligophosphonates resulting from the rearrangement of the trichloroethyl phosphite, with or without the liberation of dichloroethane and possibly of secondary phosphites. Such harmful effect on purity is higher when the phosphoric trichloride used contains traces of hydrochloric acid or when hydrochloric acid or a metallic chloride is added deliberately as catalyst.

The reactions producing the impurities are not completely understood. In particular, the phosphonates would not seem to originate from a simple Michaelis-Arbuzov transposition or condensation as in reactions (5) and (6)

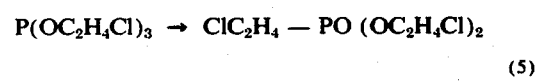

(5)

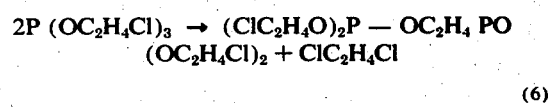

(6)

inasmuch as these reactions do not proceed rapidly except at temperatures, such as 140°C, verye much above the usual temperature of ethoxylating phosphorus trichloride.

When commercial grades of phosphorus trichloride are used, these usually contain a small proportion, generally about between 0.2 and 0.7 percent, of phosphorus oxychloride, POCl$_3$. This gives rise to a further difficulty, in that phosphorus oxychloride reacts extremely slowly with ethylene oxide, even in the presence of hydrochloric acid. Thus the POCl$_3$ is converted at best to chloroethyl chlorophosphates which still have sufficient of the original hydrolyzable chloride atoms to impart a potential acidity, i.e. subsequent contact with traces of moisture results in the liberation of hydrochloric acid. The resultant acidity is harmful to good preservation of the trichloroethyl phosphite, particularly when packaged in contact with metals.

It has been found that the phosphorus oxychloride impurity can be quantitatively ethoxylated in the presence of a conventional Lewis acid such as TiCl$_4$, ZrCl$_4$, FeCl$_3$, AlCl$_3$ and the like. These catalyze also the ethoxylation of phosphorus trichloride, but have the disadvantage of increasing side reactions and thus, as in the case of hydrochloric acid, lower the yield of pure trichloroethyl phosphite.

Without intending to be bound by theoretical considerations, a possible mechanism whereby hydrochloric acid may catalyze the formation of the undesirable secondary products may be represented by equations (7) to (10).

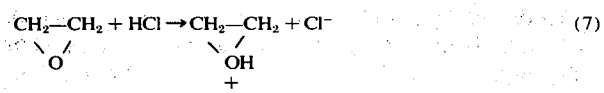 (7)

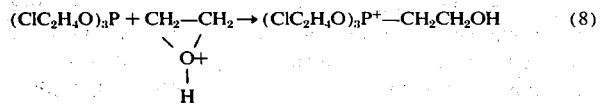 (8)

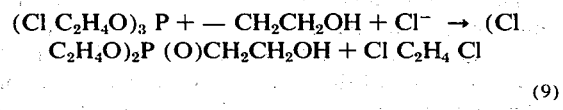 (9)

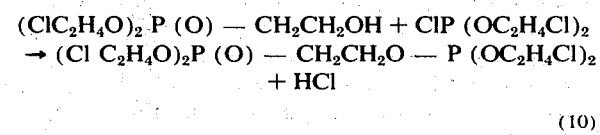 (10)

It has been proposed (U.S. Pat. No. 2,866,808) to avoid the harmful catalytic effect of acids by carrying out the ethoxylation of phosphorus trichloride in the presence of a small quantity of amine. However, the conditions for achieving the desired effect are extremely involved and hard to reproduce. As has been pointed out by A.N. Pudovik and E.M. Faizullin (Zhurnal Obschei Khimii 1962, 32, 231-7 and 1964, 34, 882-9) and as the present Applicant has verified on many occasions, the addition of amines also inhibits reaction (2), as would be expected if one accepted the mechanism of (3) and (4). Said patent recognizes implicitly the hindering role of amine; although the amine is described as "catalyst", it is recommended, to avoid "killing" the reaction, that it should be introduced gradually in solution in the epoxide. Thus even if such operation can be made to work effectively, it is encumbered by a number of drawbacks, among which there is that of rendering necessary, when one uses ethylene oxide, a special agitation equipment under pressure for the solution of the amine. It may also be dangerous because the amines are catalysts of the polymerisation of epoxides.

In short, the present state of prior art does not permit achieving ethoxylation of commercial phosphorus trichloride in a completely satisfactory manner which is reproducible and safe and yields a trichloroethyl phosphite of satisfactory purity.

SUMMARY OF THE INVENTION

A means has now been found whereby chlorides and bromides of trivalent phosphorus can be more efficiently condensed with epoxides than before. Exemplarily, a means has been found whereby commercial phosphorus trichloride can safely and conveniently be ethoxylated by ethylene oxide to produce tri(chloroethyl) phosphite of satisfactory purity in high yield.

Briefly stated, the instant invention comprises an improvement in the method of alkoxylating chlorides and bromides of trivalent phosphorus with an epoxide. Said improvement comprises performing said alkoxylating in the presence of a suitable catalytic quantity of an organic aluminum compound having the formula:

where $Q'$, $Q''$, and $Q'''$ can be the same or different from each other and can each be $C_1$–$C_{10}$ alkyl, or aryl $C_1$–$C_{10}$ alkoxyl or aryloxyl and can have one or more hydrogens substituted by halogen or by crosslinking ether oxygen, amine nitrogen or alkylene bridges to form ring structures.

In a preferred embodiment of this invention, the improvement includes using in conjunction with said organic aluminum compound a suitable stabilizing base selected from the group consisting of organic amines and organic phosphines. Whereas it has been surprisingly found that the organic aluminum compound of this invention by itself can reduce the extent of side reactions leading to undesirable by-products, the additional presence of the stabilizing base improves still further the avoidance of competing side reactions.

DETAILED DESCRIPTION

The organic aluminum compound of this invention can be any such compound having the formula $AlQ'Q''Q'''$ where the three groups $Q'$, $Q''$, and $Q'''$ chemically bound to the aluminum atom can be the same or different from each other and can be $C_1$–$C_{10}$ alkyl, or aryl $C_1$–$C_{10}$ alkoxyl or aryloxyl. The alkyl and alkoxyl groups can be saturated or unsaturated, straight-chained, branched or cyclic. The alkyl can exemplarily be methyl, ethyl, n-propyl, isopropyl, n-butyl, isobutyl, tert. butyl, hexyl, 2-ethyl hexyl, n-octyl, n-decyl, propenyl, isopropenyl, n-butenyl and the like; the alkoxyl can be methoxide (methylate), ethoxide (ethylate), n-propoxide (n-propylate), isopropylate, tert. butylrate, sec. butylate, neopentylate, 2-ethyl hexylate, n-decylate, n-octylate and the like. Any of these alkyl aryl, alkoxyl and aryloxyl groups can have one or more of its hydrogens substituted by a halogen. Thus, without thereby limiting the invention, there can exemplarily be mentioned 2-chloroethylate, 2-chloropropylate, 2-bromobutylate, 3,5-dichlorophenyl, 3,5-dibromophenyl and 4-chlorophenyl. Furthermore, any two of the groups $Q'$, $Q''$, and $Q'''$ can be cross-linked to form a ring, by substitution of a hydrogen on each group by the same ether oxygen, amine nitrogen or alkylene group such as exemplarily methylene —$CH_2$—, ethylene —$CH_2CH_2$—, or trimethylene —$CH_2CH_2CH_2$—. There can also be substitution of a single nitrogen atom for three atoms of hydrogen, one on each of the respective groups $Q'$, $Q''$ and $Q'''$, thus forming two rings.

Thus the organic aluminum compound of this invention can exemplarily be trimethyl aluminum, triethyl aluminum, tri(n-propyl) aluminum, diethyl propyl aluminum, ethyl dipropyl aluminum, tri(isopropyl) aluminum, tri(n-butyl) aluminum, tri(isobutyl) aluminum, tri(tert.butyl) aluminum, tri(n-hexyl) aluminum, tricyclohexyl aluminum, tri(2-ethylhexyl) aluminum, tri(n-octyl) aluminum, tripropenyl aluminum, tri(isopropenyl) aluminum, tri (n-butenyl) aluminum, aluminum trimethylate, aluminum triethylate, aluminum tri(n-propylate), aluminum tri(isopropylate), aluminum tri(-sec.butylate), aluminum tri-neopentylate, aluminum monoethylate di-neopentylate, aluminum tri(2-ethylhexylate), aluminum tri(n-octylate), aluminum tri(n-decylate), aluminum triphenate, aluminum tri(2-chloroethylate), aluminum tri(m-chlorophenate), diethyl aluminum isopropylate, ethyl aluminum di(isopropylate), diethyl aluminum phenate, dialuminum tri(diethylene glycolate). Without limiting the invention thereby, there can be mentioned as further examples of aluminum organic compounds having ring structures, aluminum nitrilotriethylate which has one nitrogen atom joining three Q groups into two rings and aluminum acetylacetonate and aluminum dimedonate which have alkylene bridges.

The amount of organic aluminum compound which can advantageously be used in carrying out this invention can be between 0.01 and 3 mols per 100 mols of total phosphorus in the chloride or bromide to be alkoxylated. The dose of organic aluminum compound can thus range from 0.01 to 3 mol percent of the total phosphorus, the preferred dose ranging from 0.02 to 0.2 mole percent.

The stabilizing base of this invention, which can also be termed an adjuvant or secondary stabilizer, can be any suitable amine or phosphine. Tertiary amines and tertiary phosphines are preferred.

Thus the amine can be aliphatic or aromatic, straight-chain, branched or cyclic. Without limiting the invention thereto, there can be mentioned exemplarily, trimethylamine, triethylamine, di-isopropylamine, tributylamine, tert.-butylamine, dicyclohexylamine, tricyclohexylamine, ethyl-2-hexylamine, N,N-dimethyl coco-amine, dimethyl benzylamine, N,N-dimethyl aniline, N,N-diethylaniline, diphenylamine, pyridine, quinoline, alpha-picoline, 2-methyl, 5-ethyl pyridine, dimethyl ethanolamine, triethanolamine, diethylethanolamine, dimethyl isopropanolamine, and N-methylmorpholine, while among the phosphines there can be mentioned exemplarily tributylphosphine, tricyclohexylphosphine, trioctylphosphine, diphenylphosphine, triphenylphosphine, tris-(hydroxymethyl) phosphine, tris-(cyano-2-ethyl) phosphine, tris-(diethylaminoethyl) phosphine, tris-(p-dimethylaminophenyl) phosphine and P-phenylphospholane.

The amount of stabilizing base which can advantageously be used in carrying out this invention can correspond to up to 5 mols per 100 mols of total phosphorus in the chloride or bromide to be alkoxylated. The dose of stabilizing base can thus range from 0 to 5 mol percent of the total phosphorus, the preferred range being between 0 and 0.03 mol percent.

The molar ratio of stabilizing base/organic aluminum compound is advantageously between 0 to 3.

The respective mechanisms, whereby the organic aluminum compound and stabilizing base of this invention achieve their functions, are incompletely understood. The aluminum compound surprisingly has a catalytic effect on the overall reaction of equation (2) similar to that of hydrochloric acid but without also causing side-reactions to occur such as those which occur when hydrochloric acid or conventional Lewis acids are used.

It is particularly surprising that a substantial reduction of by-product formation is obtained even in the absence of stabilizing base. Although Applicant does not wish to be bound by theoretical considerations, the additional reduction in competing by-product reactions effected in the presence of the stabilizing base is probably attributable to buffering (neutralization) of traces of free hydrochloric acids. Surprisingly the benefits of this buffering by amine can be gained when the aluminum compound of this invention is also present without the above described prior art complications attributed to inhibition of reaction (2).

A possible modification of this invention is to combine the organic aluminum compound together with the stabilizing base in the form of a coordination complex and to introduce all or part of the organic aluminum coumpound and stabilizing base into the reaction medium in this coordinated complex form, which can be completely or incompletely soluble in the reaction medium. This modification is illustrated in Example 9 herein by the use of a 1/1 molar coordination complex of tri(isobutyl)aluminum with triethylamine.

The halides of trivalent phosphorus to which this invention applies can be described by the general formula

where X can be chlorine or bromine, Y and Z can each (independently of each other) be chlorine or bromine or a monovalent radical R-, RO-, RS- or RR'N- wherein R is selected from the group of $C_1-C_{30}$ radicals consisting of alkyl, alkenyl, cycloalkyl, cycloalkenyl, aryl, alkylaryl and arylalkyl radicals and their derivatives wherein one or more hydrogen atoms are substituted by chlorine, bromine, oxygen, sulfur, nitrogen or phosphorus and wherein R' can be hydrogen or R and wherein R and R' can together form a ring and wherein Y and Z also can together form a ring.

By way of non-restrictive examples of phosphorus halides which can be used according to the invention, there can be mentioned phosphorus trichloride, phosphorus tribromide, ethyl dichlorophosphite, 2-chloroethyl dichlorophosphite, bis-(2-chloro-ethyl) chlorophosphite, bis-(2-bromo-ethyl) bromophosphite, 2-chloro-1-propyl-dichlorophosphite, 1,3-dichloro-2-propyl-dichlorophosphite, 2-chloro-1,3,2-dioxaphospholane-4,9-dichloro-3,5,8,10-tetraoxa-4,9-diphospha-[5,5]-spiro-undecane, phenyl dichlorophosphite, paraphenylene bis-(dichlorophosphite), 2-chloro-1,3,2-benzodioxaphospholine, O,S-diethyl chlorothiophosphite, 2-chloro-1,3,2-dithiaphospholane, diethylamino dichlorophosphine, bis-(dimethylamino) chlorophosphine, 2-chloro-3-methyl-1,3,2-oxazaphospholane, ethyldichlorophosphine, diethylchlorophosphine, phenyldichlorophosphine, diphenylchlorophosphine, 1-chlorophosphorinane, 10-chloro-5,10-dihydrophenophosphazine, p-p'-bis-(dichlorophosphino) biphenyl, butyl benzenephosphonochloridite, diethylamino-ethylchlorophosphine.

Among the epoxides to which this invention applies, there can be mentioned by way of non-restrictive examples of oxides of ethylene, propylene, 2,3-butylene, cyclohexene, styrene, the mono- or dioxides of vinylcyclohexene, of dicyclopentadiene, of dipentene, the epihalohydrins, the ethers and esters of glycidyl, the epoxidized fatty oils and esters, and the "epoxy" resins.

In the simplest mode of putting the process of this invention into effect one first of all charges the whole of the phosphorus halide, the organic aluminum compound, any stabilizing base and any inert diluent and then, when agitating and cooling, one gradually introduces the liquid or gaseous epoxide in a slight excess. When the exotherm (i.e. liberation of heat of reaction) has ceased, one distils off the excess of epoxide in vacuo and if necessary one filters the remaining product.

The reaction can take place in an autoclave under pressure or at atmospheric pressure, in a reactor equipped with an efficient reflux condenser capable of refluxing the whole of the reagent. The temperature can be advantageously between $-30°$ and $+120°C$ with a preference for the range from $+10°C$ to $+60°C$.

As optional inert diluent there can be used, for example, 1,2-dichloroethane, tetrachloroethylene, methylene chloride, diethyl ether, isopropyl ether, dioxane, benzene, hexane, cyclohexane.

As has been mentioned above, it is not necessary for the organic aluminum additive or the stabilizing base or any coordination complex formed by them together to be completely soluble in the reaction medium.

In an alternative embodiment of the process according to this invention, it is possible at the beginning of the reaction to charge only a part of the phosphorus halide, the organic aluminum compound, any stabilizing base and any inert diluent, the remaining portions being added subsequently during the course of alkoxylation, either separately or as a mixture. Such additions can be gradual and continuous, or they can be in finite increments.

In still another embodiment of the process of this invention, the alkoxylation can take place, continuously or semi-continuously, using for example a cooled graphite absorption column. Thus, in the case of manufacturing trichloroethyl phosphite, such as column can be fed at the top with phosphorus trichloride containing the organic aluminum compound and optionally the stabilizing base either in solution or in a stable suspension while gaseous ethylene oxide is introduced at the bottom of the column. The product recovered from the column by vacuum distillation can then yield either completely converted trichloroethyl phosphite or a pre-condensate to be recycled.

This invention will be further illustrated by description in connection with the following examples of the practice of it. In these examples and elsewhere herein, the proportions are expressed as parts by weight except where specifically stated to the contrary. Those examples designated as "control" are not illustrations of the method of this invention but show, on the other hand, disadvantages and unsatisfactory results encountered in using prior art procedures not having the benefit of the organic aluminum compound of this invention either alone or in combination with a stabilizing base.

Those examples which do illustrate the instant invention show substantially superior results as compared to the corresponding control examples, satisfying more completely the following ideal conditions:

A. Spontaneous exotherm, immediately following the addition of each increment of epoxide.

B. Low reflux of the epoxide, guaranteeing against the possibility of dangerous accumulation of epoxide.

C. The end of reaction is distinct, as evidenced by the cessation of both pungent odor and acid reaction to pH paper within a short time after the last addition of epoxide.

D. High overall rate of conversion with the absence of >P-Hal or >P(O)Hal bonds in the condensate after distilling off the excess epoxide. The latter are expressed as "hydrolyzable Cl" and determined by hydrolysis in aqueous autone (1H room temperature) and subsequent argintimetry of the freed HCl.

E. High, almost quantitative yield, by weight, of final vacuum-stripped condensate, i.e. close to theoretical. (The undesirable formation of phosphonates is accompanied by the formation of volatile dichloroethane which manifests itself in a decreased yield by weight.)

F. Content of "saponifiable chlorine" (by boiling 5 hours in half normal alcoholic potash) close to theory.

NOTE: The production of volatile dichlorethane which accompanies that of phosphonates leads also to a lowering of the percentage of saponifiable Cl in the final stripped condensate. Furthermore, in the phosphonates themselves, the percentage of saponifiable Cl is lower than the percentage of total Cl contrary to what is observed in the case of pure trichloroethyl phosphite in which the whole of the Cl is saponifiable in accordance with the reactions (11) and (12):

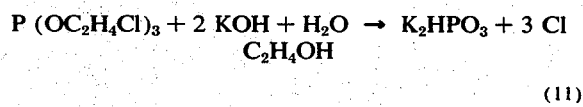

(11)

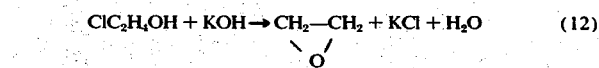

(12)

With bis-(chloroethyl) chloroethane phosphonate, on the other hand, alkaline saponification only removes little more than 2 out of the 3 atoms of chlorine present because of the slowness of the saponification of the phosphonic monoester (equation 15) and of that of the direct nucleophilic displacement of the Cl (equation 16): rapid:

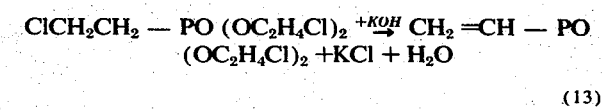

(13)

fairly rapid:

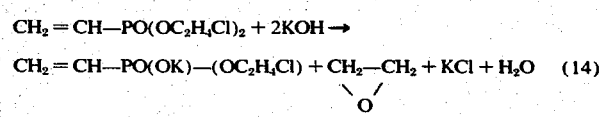

(14)

slow:

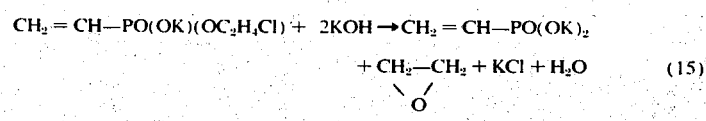

(15)

slow:

$$CH_2=CH-PO(OC_2H_4Cl)_2 + EtO^- \rightarrow CH_2=CH-$$
$$PO(OC_2H_4Cl)(OCH_4OEt) + Cl^- \quad (16)$$

A low content of saponifiable Cl is generally accompanied, and this is normal, by too high a content of total phosphorus.

G. High content of tri-co-ordinate phosphorus, that is to say of tertiary phosphites or of secondary phosphonites; these compounds were determined in general by iodometry or in some cases by mercurimetry or as specifically indicated by $^{31}$P NMR.

H. Low contents of phosphonates (or phosphinates) as determined by infrared spectrometry or by the $^{31}$P NMR and of secondary phosphites (or phosphonites) (determined chemically or by NMR).

EXAMPLE 1 (control)

A 3-necked flask equipped with an agitator and a reflux condenser cooled by brine at −10°C was charged with 1 mol of commercial phosphorus trichloride containing 0.55 percent by weight of phosphorus oxychloride (determined by $^{31}$P NMR), at a temperature of 20°C. Then after purging the atmosphere of the flask with dry nitrogen, 140 g of gaseous ethylene oxide (or an excess of 6.2 percent over theoretical) was introduced over a period of approximately 3 hours through a tube dipping into the liquid. Heat of reaction was generated immediately and the temperature rose in a few minutes to 40°–50°C; temperature then maintained in range of 40°–50°C. by cooling the flask.

Immediately after the addition of ethylene oxide was completed, the reaction mixture still had a pungent odor and was still acid to pH paper. The mixture was left standing for 2 hours and was then stripped under 15 mm of mercury at 50°C. The remaining phosphite had the following properties:

| | |
|---|---|
| Yield by weight | 96.85% of theory |
| Refractive index $n_D^{25}$ | 1.4875 |
| Hydrolyzable Cl | 1,255 ppm |
| Saponifiable Cl | 37.2% (theory = 39.5) |
| Total Tertiary phosphites | 80%, as P(OC$_2$H$_4$Cl)$_3$ |
| Analysis by $^{31}$P NMR | |
| P(OC$_2$H$_4$Cl)$_3$ | 70% |
| HPO(OC$_2$H$_4$Cl)$_2$ | 4.4% |
| OP(OC$_2$H$_4$Cl)$_3$ | 2.8% |
| ClC$_2$H$_4$ — PO(OC$_2$H$_4$Cl)$_2$ | 1.9% |
| (ClC$_2$H$_4$O)$_2$ P — OC$_2$H$_4$ — PO(OC$_2$H$_4$Cl)$_2$ | 17.8% |
| (ClC$_2$H$_4$O)$_2$ P(O) — OC$_2$H$_4$ —PO(OC$_2$H$_4$Cl)$_2$ | 1% |
| (ClC$_2$H$_4$O)$_2$ P(O) — C$_2$H$_4$ — PO(OC$_2$H$_4$Cl)$_2$ | 1.7% |
| Pyrophosphites and diphosphites | not visible |

EXAMPLE 2 (control)

Example 1 was repeated except that 0.2 percent by weight of alpha-picoline was added to the phosphorus trichloride. Because no heat of reaction was observed after the addition of approximately 15 g of ethylene oxide, the mixture was gently heated. At about 25°C a sudden violent reaction took place with vigorous boiling and an uncontrollable evolution of ethylene oxide. Thus use of a base in the absence of the aluminum compound of this invention is not satisfactory.

EXAMPLE 3 (control)

Example 1 was repeated except that carefully purified phosphorus trichloride was used, containing less than 0.1 percent of POCl$_3$ and practically no HCl. The introduction of the first fractions of ethylene oxide resulted in only an insignificant evolution of heat but after about 10 minutes the reaction started up suddenly and the temperature rose rapidly to 70°C. In order to control the reaction and terminate it normally as in Example 1, it was necessary to use a much greater excess of ethylene oxide (approximately 25%). The following properties were found for the trichlorethyl phosphite obtained after stripping in vacuo:

yield by weight = 98.3% of theory
$n_D^{25}$ = 1.4868
Hydrolyzable Cl = 50 ppm
Saponifiable Cl = 37.9%
Total phosphorus = 11.66% (theory: 11.5)
Tertiary phosphites = 92%, as P(OC$_2$H$_4$Cl)$_3$
Secondary phosphites = 0.22% as HPO(OC$_2$H$_4$Cl)$_2$
Phosphonates = 7.3% as Cl C$_2$H$_4$ — PO (OC$_2$H$_4$Cl)$_2$
(by infrared)

EXAMPLE 4 (control)

Example 3 was repeated except that there was added to the phosphorus trichloride 0.2 percent by weight of chloroethanol as catalyst and that an 8 percent excess of ethylene oxide was used. No delay of exotherm was observed in this case and the reaction could be continued throughout under normal conditions. However, the following unsatisfactory properties were found for the end product:

Yield by weight = 96.2% of theory
Hydrolyzable Cl = 990 ppm
Saponifiable Cl = 37.3%
Tertiary phosphites = 81.5% as P(OC$_2$H$_4$Cl)$_3$
Secondary phosphites = 2.15% as HPO(OC$_2$H$_4$Cl)$_2$

EXAMPLE 5 (control)

Example 4 was repeated except that the excess of ethylene oxide was raised to 20 percent and in addition to the chloroethanol, 0.6 percent by weight of pyridine was added, reckoned on the phosphorus trichloride. Once again, the exotherm of the reaction was irregular. The analysis of the end product gave:

Yield by weight = 97.6% of theory
odor = pungent
Hydrolyzable Cl = 1220 ppm
Saponifiable Cl = 38.55%
Tertiary phosphites = 92% as P(OC$_2$H$_4$Cl)$_3$
Secondary phosphites = 2.25% as HPO(OC$_2$H$_4$Cl)$_2$

EXAMPLE 6 (control)

Example 1 was repeated except that 0.21 percent by weight of titanium tetrachloride was added to commercial phosphorus trichloride containing 0.75 percent of POCl$_3$.

The exotherm was vigorous and regular throughout the entirel introduction of the ethylene oxide, using a 7 percent excess during which time the temperature was maintained at between 40 and 50°C. The analysis of the filtered end product gave:

Yield by weight = 96.6 percent of theory
Hydrolyzable Cl = 30 ppm
Saponifiable Cl = 37.25%
Tertiary phosphites = 85% as P(OC$_2$H$_4$Cl)$_3$

EXAMPLE 7

Example 6 was repeated except that in place of the TiCl$_4$ there was used tri-isobutyl aluminum in an amount corresponding to 0.036 percent by weight of PCl$_3$. A marked exotherm was observed from the very beginning of the ethylene oxide injection. The excess of ethylene oxide used was 1 percent. The slightly turbid end product was stripped in vacuo as previously and filtered, yielding a colorless and limpid phosphite with the following properties, showing improved yield using the aluminum compound even without stabilizing base:

Yield by weight = 99.2% of theory
$n_D^{25}$ = 1.4860
Hydrolyzable Cl = 30 ppm
Saponifiable Cl = 38.05%
Tertiary phosphites = 91% as $P(OC_2H_4Cl)_3$

EXAMPLE 8

Using the procedure of Example 1, 1 mol of phosphorus trichloride containing 0.3 percent of $POCl_3$, was reacted with ethylene oxide in 1 percent excess in the presence of 0.18 percent by weight of triisobutyl aluminum and 0.20 percent of diethylethanolamine reckoned on the phosphorus trichloride. The reaction mixture, which was very opalescent at the beginning, became practically clear at the end of the reaction (excess of ethylene oxide = 1%). No delay in exotherm was observed.

The analysis of the stripped and filtered end product gave the following results indicating still further improvement in presence of also a stabilizing base.

Yield by weight = 99.65% of theory
Hydrolyzable Cl = 135 ppm
Saponifiable Cl = 38.4%
Tertiary phosphites = 94% as $P(OC_2H_4Cl)_3$

EXAMPLE 9

Example 6 was repeated except that in place of the $TiCl_4$, there was used 1/1 complex tri-isobutyl aluminum/triethylamine, in amount corresponding to 0.26 percent by weight of $PCl_3$, dissolved in 3 mls. of petroleum ether; the excess of ethylene oxide used was 11 percent. No delay was observed in the exotherm. Temperature was maintained at 40°–50°C throughout. The analysis of stripped and filtered end product gave:

Yield by weight = 98.8% of theory
$n_D^{25}$ = 1.4865
Hydrolyzable Cl = < 50 ppm
Saponifiable Cl = 38.3%
Tertiary phosphites = 92.7% as $P(OC_2H_4Cl)_3$

EXAMPLE 10

Example 9 was repeated, except that the reaction temperature was maintained at between 20° and 30°C. The results were as follows:

Yield by weight = 97.2%
Hydrolyzable Cl = < 50 ppm
Saponifiable Cl = 38.5%
Tertiary phosphites = 94.5% as $P(OC_2H_4Cl)_3$

EXAMPLES 11 to 17

Example 6 was repeated, replacing the $TiCl_4$ by aluminum isopropylate either in association or not with a secondary stabilizer. The special operational conditions and the results are set out in the table below (the percentages shown are percentages by weight).

A series of experiments was thus carried out in each of which one mol of commercial phosphorus trichloride as in Example 6 was condensed under conditions recorded in the accompanying table. In each case aluminium isopropylate was used as catalyst, the respective amounts based on phosphorus trichloride, being given in the second column of the table. In Example 11, no secondary stabilizer was used. In experiments 12–17, secondary stabilizers were used as given in the table. In each case the final reaction mixture was subjected to filtration. Before filtration, the products of Experiments 11 to 15 contained in suspension very small amounts of white precipitate. The products of Experiments 16 and 17 contained larger amounts of yellow precipitate.

In the case of Example 17, the $^{31}P$ NMR analysis gave the following composition:

| $P(OC_2H_4Cl)_3$ | 97.9% |
| H P O $(OC_2H_4Cl)_2$ | 0.4% |
| $OP(OC_2H_4Cl)_3$ | 1.6% |
| Phosphonates | not visible |

| (iso-PrO)₃Al | Secondary stabilizer | | Excess of ethylene oxide used (% reckoned on theory) | Phosphite obtained (filtered) | | | Tertiary phosphites % as $P(OC_2H_4Cl)_3$ |
|---|---|---|---|---|---|---|---|
| (% of PCl₃) | Nature | % of PCl₃ | | Yield by weight (% of theory) | Hydrolyzable Cl (ppm) | Saponifiable Cl (%) | |
| 0.08 | nil | — | 2.7 | 99.6 | <25 | 38.2 | 92 |
| 0.2 | N-N-dimethylaniline | 0.2 | 6.2 | 99.4 | 10 | 38.5 | 93.9 |
| 0.2 | Tributylamine | 0.15 | 7 | 99.0 | 25 | 38.4 | 94.5 |
| 0.1 | do. | 0.15 | 9 | 98.6 | 250 | 38.65 | 94.7 |
| 0.1 | diethyl ethanolamine | 0.10 | 11.8 | 98.4 | 20 | 38.45 | 94.3 |
| 0.2 | tributylphosphine | 0.32 | 8.5 | 99.4 | 50 | 38.85 | 97.5 |
| 0.2 | triphenylphosphine | 0.47 | 13 | 99.8 | 300 | 38.95 | 98.5 |

EXAMPLE 18

Into an enamelled 10-liter autoclave provided with blade agitation there were placed 20 mols of phosphorus trichloride (containing 0.75 percent of phosphorus oxychloride) and there was added to this 0.1 percent by weight of aluminum isopropylate and 0.1 percent by weight of diethyl ethanolamine. 60.5 mols of liquid ethylene oxide were gradually introduced incrementally over 6 hours, cooling so that the temperature did not exceed 50°C. The pressure was raised at a maximum to 2 atmospheres. The final mixture, which was neutral to pH paper, was stripped under 19 mm Hg at a maximum temperature of 55°C and was then filtered so as to eliminate a slight turbidity. There was finally obtained 5,374 g of trichlorethyl phosphite, or a yield by weight of 99.7%.

The analysis gave the following results:
Hydrolyzable Cl = 60 ppm
Saponifiable Cl = 38.2%
Tertiary phosphites = 95.5% as $P(OC_2H_4Cl)_3$

EXAMPLE 19

One mol of phosphorus chloride was condensed with an amount of ethylene oxide corresponding to 118% of the theoretical quantity in the presence of aluminum nitrilotriethylate $$Al{-}{\genfrac{}{}{0pt}{}{\genfrac{}{}{0pt}{}{OCH_2CH_2}{OCH_2CH_2}}{OCH_2CH_2}}{-}N$$

in amount corresponding to 0.18% by weight of the $PCl_3$. No delay in exotherm was observed. The end product contained in suspension a large quantity of insolubles which were separated by filtration. The analysis of the filtrate gave:
Yield by weight = 98.0%
Hydrolyzable Cl = 40 ppm
Saponifiable Cl = 38.1%
Tertiary phosphites = 92.4% as $P(OC_2H_4Cl)_3$

EXAMPLE 20

Example 15 was repeated except that in place of the aluminum isopropylate there was used aluminum tertiary butylate (tert.-BuO)$_3$Al in amount 0.13 percent by weight of $PCl_3$. The excess of ethylene oxide used was 25 percent. No delay in exotherm was observed.

The slightly opalescent end product was not filtered.
Yield by weight = 98.0%
Hydrolyzable Cl = 22 ppm
Saponifiable Cl = 38.65%
Tertiary phosphites = 94.4% as $P(OC_2H_4Cl)_3$

EXAMPLE 21

A similar condensation of $PCl_3$ was carried out, using aluminum secondary butylate (sec.-BuO)$_3$Al in amount of 0.14 percent by weight of $PCl_3$. The excess of ethylene oxide used was 15 percent. No delay in exotherm was observed. The end product which was slightly opalescent, was not filtered:
Yield by weight = 98.5%
Hydrolyzable Cl = 18 ppm
Saponifiable Cl = 38.4%
Tertiary phosphites = 94.6% $P(OC_2H_4Cl)_3$

EXAMPLE 22

Example 4 was repeated except that in place of the chloroethanol there was used aluminum acetylacetonate in amount 0.32 percent by weight of $PCl_3$, the excess of ethylene oxide used being 14 percent. No delay in exotherm was observed.

After standing overnight at ambient temperature, the mixture was stripped in the usual manner so as to give a clear end product.:
Yield by weight = 98.5%
Hydrolyzable Cl = 220 ppm
Saponifiable Cl = 38.9%
Tertiary phosphites = 95.8% as $P(OC_2H_4Cl)_3$

EXAMPLE 23 (control)

In a three-necked flask equipped with mechanical agitation and a reflux condenser, there was placed at ambient temperature 1 mol of commercial phosphorus trichloride titrating 1.55 percent of $POCl_3$. 3.11 mols (excess= 3.7%) of liquid propylene oxide were introduced dropwise using a dropping funnel.

The temperature rose rapidly and the flask was cooled so as to maintain it at 70° ± 5°C.

After all exotherm had ceased the mixture was allowed to stand for 12 hours at ambient temperature. The excess of propylene oxide was then removed in vacuo (t = 50°C, p = 15 mm Hg). The analysis of the phosphite obtained gave:
Yield by weight = 98.8%
Hydrolyzable Cl = 1800 ppm
Saponifiable Cl = 33.2% (theory = 34.2)
Tertiary phosphites = 80.7% as $P(OC_3H_6Cl)_3$ This example is not an illustration of the instant invention but illustrates the propoxylation of $PCl_3$ in the absence of the catalyst and secondary stabilizer of this invention.

EXAMPLE 24

Using the procedure of Example 23, but adding to the $PCl_3$ 0.2 percent by weight of aluminum isopropylate and 0.2 percent by weight of alpha-picoline, and using a 5.4 percent excess of propylene oxide, there was obtained a product with the following properties:
Yield by weight = 99.6%
Hydrolyzable Cl = 155 ppm
Saponifiable Cl = 33.2%
Tertiary phosphites = 91.8% as $P(OC_3H_6Cl)_3$ The presence of the catalyst and adjuvant of this invention substantially increased the yield.

EXAMPLE 25 (control)

Example 23 was repeated, replacing the propylene oxide by epichlorohydrin. As no exotherm was found in the cold, the phosphorus trichloride was brought to boiling point. Then the temperature was maintained at between 75° and 100°C. Even at these temperatures, the exotherm was not immediate after each addition of epichlorophydrin, whose overall charge had a stoichiometric excess of 10 percent. A standing for 3 hours at 95° to 100°C was necessary in order to ensure that the reaction mixture no longer reddened Prolabo pH paper. Evacuation at 50°C under 0.5 mm Hg. succeeded in removing only part of the epichlorohydrin.

The residue, a turbid liquid, was filtered and analysed:
Yield by weight = 101.5%
Hydrolyzable Cl = 550 ppm
Saponifiable Cl = 49.55% (theory: 51.3)
Tertiary phosphites = Approx. 89% as $P(OC_3H_5Cl_2)_3$ (by mercurimetry)
Free epichlorohydrin = approx. 3.5% (by proton NMR)
Phosphonates = light P = O band in infrared at 1260 $cm^{-1}$

EXAMPLE 26

Example 25 was repeated, adding to the $PCl_3$ 0.21 percent by weight of aluminum isopropylate and 0.19 percent of N-methylmorpholine. This time the reaction started off in the cold and it was possible to carry it out completely without exceeding 50°C. For a same excess of epichlorohydrin as that in Example 25 a supplementary standing period of one hour at 50°C was sufficient to cause the disappearance of any acidity which could be detected with pH paper. After evacuating as in Example 25, to remove excess of epoxide, a turbid product was obtained which, after filtration, gave the following analysis:

Yield by weight = 101.7%
Hydrolyzable Cl = 40 ppm
Saponifiable Cl = 51.3%
Tertiary phosphites = approx. 93.2% as P(OC$_3$H$_5$Cl$_2$)$_3$ (by mercurimetry)
Free epichlorohydrin = approx. 0.9%
Phosphonates = P = O band still weaker than in Example 25.

EXAMPLE 27 (control)

The operation was carried out as in Example 1 but replacing PCl$_3$ by phenyl dichlorphosphine. Although no delay in exotherm was observed, the final reaction mixture, despite an excess of 20 percent of ethylene oxide, remained acid to pH paper even after standing for 4 hours at approximately 20°C. After removing the excess of ethylene oxide by evacuation at 50°C under 15 mm Hg, one obtained a phenylphosphonite complying with the following characteristics:

Yield by weight = 97.4%
Hydrolyzable Cl = 1050 ppm
Saponifiable Cl = 24.4% (theory - 26.6)
Secondary phosphonites = 60.4% as C$_6$H$_5$ - P(OC$_2$H$_4$Cl)$_2$

EXAMPLE 28

Example 27 was repeated, adding to the phenyl dichlorophosphine 0.13 percent by weight of aluminum tertio-butylate and 0.22 percent of triphenylphosphine. For the same excess of ethylene oxide as in Example 27, the end reaction mixture no longer showed any acidity which could be detected with pH paper and the supplementary standing time could be dispensed with. The phenylphosphonite obtained after vacuum stripping contained in suspension a yellowish insoluble which had to be separated by filtration.

Yield by weight = 99.0%
Hydrolyzable Cl = 200 ppm
Saponifiable Cl = 25.9%
Secondary phosphonites = 90% as C$_6$H$_5$ — P(OC$_2$H$_4$Cl)$_2$

EXAMPLE 29 (control)

The operation was carried out as in Example 23, replacing PCl$_3$ by cyclic ethylene chlorophosphite (also known as 2-chloro-1,3,2-dioxaphospholane) and the propylene oxide by cyclohexene oxide (containing 5% of 1-methyl-cyclohexene-oxide). The reaction was immediately exothermic and it was possible to conduct it throughout without exceeding 50°C. However, the final reaction mixture (containing a total excess of epoxides of 20%) was acid to pH paper. A supplementary heating for 45 minutes at 75°C did not succeed in causing this acidity to disappear.

Finally the mixture was vacuum stripped at 88°C under 0.7 mm Hg so as to yield a somewhat opalescent phosphite giving the following analysis:

Yield by weight = 101.0%
Hydrolyzable Cl = 1340 ppm
Saponifiable Cl = 16.3% (theory: 15.8)
Tertiary phosphites = 89.5% (expressed as phosphite J)

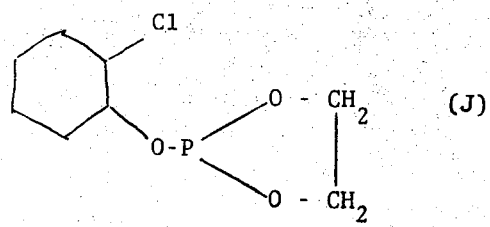

EXAMPLE 30

Example 29 was repeated with the same excess of epoxide but adding to the ethylene chlorophosphite 0.2% by weight of aluminum tertio-butylate and 0.17% of triphenylphosphine. Again the final reaction mixture was acid to pH paper, but 15 minutes of heating at 75°C was sufficient to cause this acidity to disappear. The phosphite obtained after vacuum distillation as in Example 29 contained an insoluble which was collected on the surface after a few hours and which was eliminated by skimming.

Yield by weight = 102.4%
Hydrolyzable Cl = 260 ppm
Saponifiable Cl = 16.1%
Tertiary phosphites = 89.2% as phosphite J

EXAMPLE 31 (control)

Example 1 was repeated, replacing PCl$_3$ by phosphorus tribromide (containing 0.15% of POBr$_3$) and cooling sufficiently for the temperature to remain in the vicinity of +20°C. The reaction started off spontaneously. Towards the end an orange precipitate rich in phosphorus was deposited. The final mixture, containing an excess of 20% of ethylene oxide, was slightly acid to pH paper; it was allowed to stand overnight in a refrigerator but this did not cause this acidity to disappear. After stripping at 20°C under 0.6 mm Hg and filtration one obtained tris(2-bromo-ethyl) phosphite possessing the following properties:

Yield by weight = 95.5%
Hydrolyzable Br = 13,600 ppm (4 hours' hydrolysis)
Saponifiable Br = 58.0% (theory: 59.5)
Tertiary phosphites = 71% as P(OC$_2$H$_4$Br)$_3$ (by mercurimetry)

EXAMPLE 32

Example 31 was repeated, adding to the PCl$_3$ 0.15 percent of aluminum tertio-butylate and 0.25 percent of triphenylphosphine. No delay in exotherm was observed. There was again noted the formation of an orange insoluble rich in phosphorus in addition to the incompletely soluble complex formed by the two additives.

The final reaction mixture containing an excess of 13 percent of ethylene oxide was neutral. It was stripped without delay at ambient temperature under 0.6 mm Hg and was then filtered.

Yield by weight = 98.9%
Hydrolyzable Br = 1,900 ppm
Saponifiable Br = 58.8%

Tertiary phosphites = 90.5% as P(OC$_2$H$_4$Br)$_3$ (by mercurimetry)

It will be understood that it is intended to cover all changes and modifications of the examples of the invention herein chosen for the purpose of illustration which do not constitute departures from the spirit and scope of the invention.

What is claimed is:

1. In the method of alkoxylating chlorides and bromides of trivalent phosphorus with an epoxide, wherein the trivalent phosphorus can be described by the general formula

where X can be chlorine or bromine, Y and Z can each (independently of each other) be chlorine or bromine or a monovalent radical R-, RO-, RS- or RR'N- wherein R is selected from the group of C$_1$-C$_{30}$ radicals consisting of alkyl, alkenyl, cycloalkyl, cycloalkenyl, aryl, alkylaryl and arylalkyl radicals and their derivatives wherein one or more hydrogen atoms are substituted by chlorine, bromine, oxygen, sulfur, nitrogen or phosphorus and wherein R' can be hydrogen or R and wherein R and R' can together form a ring and wherein Y and Z also can together form a ring, the improvement which comprises performing said alkoxylating, in the presence and absence of a stabilizing base, and in the presence of a suitable catalytic quantity of an organic aluminum compound selected from (1) compounds having the formula

where Q', and Q'' and Q''' can be the same or different from each other and can each be C$_1$-C$_{10}$ alkyl or aryl, C$_1$-C$_{10}$ alkoxyl or aryloxyl and can each have one hydrogen substituted by halogen aluminum nitrilotriethylate, (3) aluminum acetylacetonate and (4) aluminum dimedonate.

2. The improvement of claim 1 which includes using in conjunction with said organic aluminum compound a suitable stabilizing base selected from the group consisting of tertiary amines and organic phosphines.

3. The improvement of claim 1 wherein the aluminum compound is aluminum nitrilotriethylate.

4. The improvement of claim 1 wherein the aluminum compound is aluminum acetylacetonate.

5. The improvement of claim 1 wherein the aluminum compound is aluminum dimedonate.

6. In the method of claim 1 wherein phosphorus trichloride is ethoxylated by ethylene oxide, the improvement of claim 1 wherein ethoxylation is performed in the presence of a tri(C$_1$-C$_{10}$ alkyl) aluminum or an aluminum tri (C$_1$-C$_{10}$ alkoxylate).

7. The improvement of claim 6 wherein the ethoxylation is performed in the presence of a tertiary amine or organic phosphine.

8. In the method or reacting phosphorus trichloride having as an impurity phosphorus oxychloride in the amount up to about 5 percent based on the weight of phosphorus trichloride, with ethylene oxide in amount up to about 3.6 mol per mol of total phosphorus, the improvement comprising reacting the phosphorus trichloride and ethylene oxide, in the presence and absence of a stabilizing base, and in the presence of a tri (C$_1$-C$_{10}$) alkyl aluminum or an aluminum tri(C$_1$-C$_{10}$ alkoxylate), in the amount corresponding to from 0.01 to 3 mols per 100 mols of total phosphorus.

9. The improvement of claim 8 wherein in conjunction with said aluminum compound there is present a stabilizing base selected from the group consisting of tertiary amines and organic phosphines, in amount corresponding to from 0 to 5 mols per 100 mols of total phosphorus.

* * * * *

UNITED STATES PATENT AND TRADEMARK OFFICE
CERTIFICATE OF CORRECTION

PATENT NO. : 3,899,550
DATED : August 12, 1975
INVENTOR(S) : Michel Demarcq

It is certified that error appears in the above-identified patent and that said Letters Patent e hereby corrected as shown below:

Column 2, line 18, "chlorethyl" should read --chloroethyl--.

Column 2, line 46, "verye" should read --very--.

Column 4, line 44, "butylrate" should read --butylate--.

Column 5, line 58, "0 to 3." should read --0 and 3.--.

Column 6, line 17, "coumpound" should read --compound--.

Column 7, line 41, "such as column" should read --such a column--.

Column 7, line 64, "control" should read --"control"--.

Column 8, line 13, "(1H room temperature)" should read --(1H at room temperature)--.

Column 8, line 26, "saponifiable Cl" should read --"saponifiable Cl"--.

Column 10, line 54, "entirel" should read --entire--.

Columns 11 & 12, " Ex. No." should be inserted.
    11
    12
    13
    14
    15
    16
    17

UNITED STATES PATENT AND TRADEMARK OFFICE
CERTIFICATE OF CORRECTION

PATENT NO. : 3,899,550
DATED : August 12, 1975
INVENTOR(S) : Michel Demarcq

It is certified that error appears in the above—identified patent and that said Letters Patent are hereby corrected as shown below:

Column 18, line 2, "halogen aluminum" should read --halogen (2) aluminum--.

Signed and Sealed this fourth Day of May 1976

[SEAL]

Attest:

RUTH C. MASON
*Attesting Officer*

C. MARSHALL DANN
*Commissioner of Patents and Trademarks*